United States Patent Office.

VICTOR DUCANCEL AND EUGÈNE FORTIN, OF REIMS, MARNE, FRANCE.

PREPARING A VEGETABLE SIZE FOR USE IN TEXTILE MANUFACTURES.

SPECIFICATION forming part of Letters Patent No. 305,579, dated September 23, 1884.

Application filed July 30, 1884. (No specimens.)

*To all whom it may concern:*

Be it known that we, VICTOR DUCANCEL and EUGÈNE FORTIN, both citizens of the French Republic, and residents of Reims, Marne, France, have jointly invented certain Improvements in Preparing a Vegetable Size for Use in Textile Manufactures, of which the following is a specification.

The present process of sizing threads, yarns, &c., with hot preparations of fecula, starch, &c., presents several serious inconveniences. The quantity of water in the bath is constantly varying, and a thickened film or crust forms on the surface of the hot size, which attaches itself in lumps to the yarn. This crust dries on the yarn, and by stiffening it at these points is apt to produce a rupture of the yarn. It is also apt to produce a spotted appearance when the fabric or yarn is dyed.

To avoid these inconveniences is the object of our present invention, by which we seek to produce a size-bath that will always be uniform in respect of dilution, and by which we seek to avoid the formation of a crust or film on the bath by preparing it without heat or cooking. We take advantage of the property possessed by alkalies of setting free the sizing matter contained in farinaceous substances, whereby we are enabled to employ this matter without cooking or heat and in their natural state.

We may vary the proportions of the materials we employ in the preparation of our vegetable size; but we give below a mode of preparation together with proportions that will produce good results. Dissolve in sixty liters of cold water nine to ten kilograms of fecula. Dissolve in twenty liters of cold water three kilograms of caustic soda. Mix together these two solutions. This will produce a cold alkaline preparation of size. To neutralize it, mix with it twenty liters of cold water with which has been mixed one kilogram of sulphuric acid. If we wish to employ an alkaline size, the soda should be dissolved in forty liters of cold water and the diluted acid omitted. The cold preparation of size thus produced may be used with the best results, either by hand or mechanically, on all threads or yarns designed for the production of woven fabrics, whether of wool, cotton, silk, flax, ramee, or other fiber. Being prepared and used cold, it is at first and remains very uniform as to dilution, and no crust or thickened skin forms on the surface of the bath.

We do not confine ourselves to the materials herein named, nor to the exact proportions specified. These may be varied to some extent without departing from the spirit of our invention. For example, while we prefer caustic soda, we may employ potash, magnesia, lime, or salts having these alkaline bases, and while we usually employ sulphuric acid when we wish to neutralize the alkali, we may employ other acids—as hydrochloric, acetic, and nitric acids. Any farinaceous or starchy substance may be used in the preparation of our vegetable size.

Having thus described our invention, we claim—

1. The herein-described method of preparing a vegetable size for use in textile manufactures, which consists in dissolving a farinaceous substance—as fecula or starch—in cold water, and then submitting the same to the action of an alkali without the aid of heat, substantially as and for the purposes set forth.

2. The herein-described method of preparing a neutral vegetable size for use in textile manufactures, which consists in dissolving a farinaceous substance in cold water, then adding thereto a solution of an alkali in the proper proportion to free the sizing matter, and then adding thereto an acid in sufficient quantity to neutralize the alkali, substantially as and for the purposes set forth.

In witness whereof we have hereunto signed our names in the presence of two subscribing witnesses.

VICTOR DUCANCEL.
    EUGÈNE FORTIN.

Witnesses:
 OLIVIER ZHENDRE,
 STEPHANE DUCANCEL.